US011542743B2

(12) United States Patent
Bennie et al.

(10) Patent No.: US 11,542,743 B2
(45) Date of Patent: Jan. 3, 2023

(54) AUTOMATIC VEHICLE WINDOW CONTROL SYSTEMS AND METHODS

(71) Applicant: Ford Global Technologies, LLC, Dearborn, MI (US)

(72) Inventors: Justin Bennie, Sterling Heights, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 16/750,712

(22) Filed: Jan. 23, 2020

(65) Prior Publication Data

US 2021/0230925 A1 Jul. 29, 2021

(51) Int. Cl.
*B60R 22/00* (2006.01)
*E05F 15/73* (2015.01)

(52) U.S. Cl.
CPC ........ *E05F 15/73* (2015.01); *E05F 2015/767* (2015.01); *E05Y 2900/55* (2013.01)

(58) Field of Classification Search
CPC . E05F 15/73; E05F 2015/767; E05Y 2900/55
USPC .......................................................... 701/49
See application file for complete search history.

(56) References Cited

U.S. PATENT DOCUMENTS 5,189,839 A * 3/1993 DeLand .................... B60J 5/06 49/360
5,239,779 A * 8/1993 DeLand ................. E05B 81/20 49/360
8,080,961 B2 12/2011 Miller
10,030,432 B1 * 7/2018 Heirtzler, Jr. ........... E05F 15/77
10,060,170 B2 * 8/2018 Gómez .................. B60J 5/0493
10,227,810 B2 * 3/2019 Linden .................. B60R 13/043
11,040,593 B1 * 6/2021 Chen .................. B60H 1/00742
2007/0027587 A1 * 2/2007 Pedemas ................ E05F 15/41 701/2
2016/0251889 A1 * 9/2016 Shibata .................. E05F 15/41 701/49
2017/0145729 A1 * 5/2017 Hernandez-Urbina ...................... E05F 15/689
2020/0141176 A1 * 5/2020 Ichinose ................ E05B 81/64
2020/0300019 A1 * 9/2020 Dingli .................. E05F 15/431
(Continued)

FOREIGN PATENT DOCUMENTS

CN 103556901 B 1/2016

OTHER PUBLICATIONS

Monticello, Mike, "Your Car's Key Fob May Have Hidden Features," Web page <https://www.consumerreports.org/cars-driving/your-cars-key-fob-may-have-hidden-features.html>, 6 pages, retrieved from the internet on Aug. 28, 2019.

*Primary Examiner* — Chi Q Nguyen
(74) *Attorney, Agent, or Firm* — Frank Lollo; Eversheds Sutherland (US) LLP

(57) ABSTRACT

Automatic vehicle window control systems and methods are provided herein. An example method includes determining a first operating height of a first window of a vehicle, determining a second operating height of a second window of the vehicle, comparing the first operating height with the second operating height, and selectively adjusting the first operating height or the second operating height to be substantially equal to one another when the first operating height and the second operating height are not substantially equal.

20 Claims, 5 Drawing Sheets

(56) References Cited

U.S. PATENT DOCUMENTS

| | | | | |
|---|---|---|---|---|
| 2020/0408027 | A1* | 12/2020 | Fujita .................... | E05F 15/689 |
| 2021/0372192 | A1* | 12/2021 | Matzek .................. | E05F 15/77 |

* cited by examiner

AUTOMATIC VEHICLE WINDOW CONTROL SYSTEMS AND METHODS

FIELD OF INVENTION

The present disclosure is generally directed to systems and methods that automatically control translation of vehicle windows.

BACKGROUND

Car enthusiasts care very much about their car's appearance and prefer to optimize vehicle appearance. It is estimated that people from the ages 16-24 spend a total of 7.2 billion dollars customizing their cars every year. With the prevalence of social media, this new generation of customers cares more than ever about vehicle appearance and the social aspect of their vehicle. By way of example, Mustang drivers (and sport vehicles in general) may prefer to roll both their front windows down part way rather than all the way. These drivers may also prefer the windows to be exactly equivalent, especially convertible units or cars with a sun/moon roof.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein enhance a user's experience with a selectable feature that allows a user to toggle on and off a setting where two or more windows are adjusted to be at the same, or substantially the same level. This setting/feature can be made available through personalized vehicle settings on a touch screen dashboard (or other similar human machine interface) as a binary option (e.g., on or off). The feature can also be activated audibly (e.g., natural language control through a vehicle voice control system).

Comparisons between window operating heights can be made using camera images. That is, two or more windows in a vehicle can be monitored using cameras. The images obtained by the camera can be used to detect differences between window operating heights. When a discrepancy is determined, the operating height of one of the windows can be adjusted until the window operating heights are substantially equal.

Currently, when both front windows of a vehicle are rolled down, there is no way to automatically control the windows roll down to the same height. That is, there exists no means or mechanism whereby a user can ensure that their windows are set at equivalent rolled-down levels. To be sure, this is a quality of life issue for some users as they may have to manually tamper with both windows until they appear to be even. This could even potentially lead to distracted driving, if someone decides to look at their windows and adjust them constantly until they appear even. Thus, adjusting both windows to the same level is a desirable UX (user experience) feature. However, in current vehicles, it is an inconvenient and distracting process. Broadly, the present disclosure provides systems and methods for automatic window control, where two or more windows can be placed into a substantially equal operating height relative to one another.

Illustrative Embodiments

Figure 1:
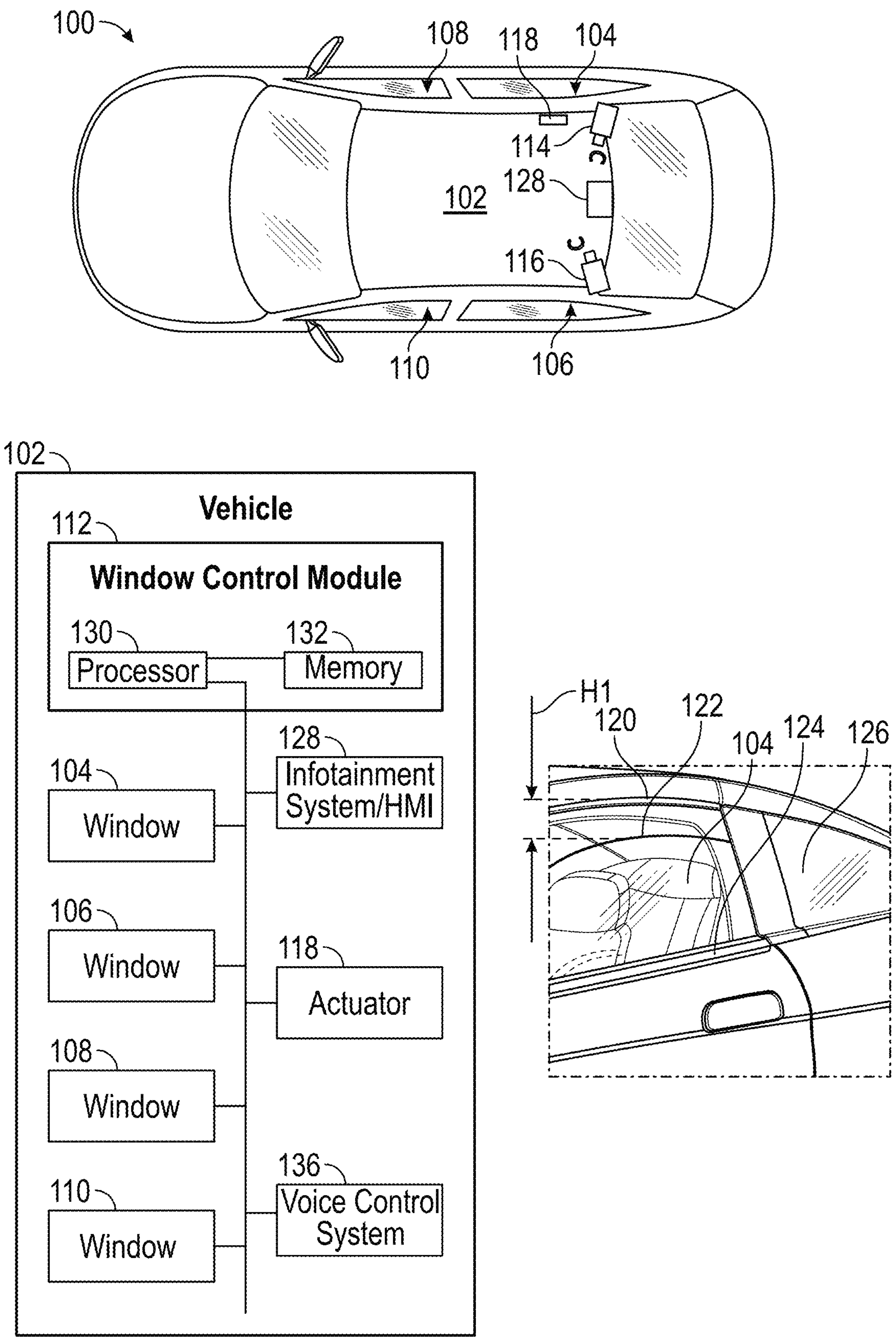
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. A vehicle 102 is illustrated with at least two windows 104 and 106. The vehicle 100 can also include two additional windows 108 and 110 in some instances. The vehicle 102 can include a window control module 112, a first camera 114, a second camera 116, and an actuator 118.

Generally, a window such as the window 104 can be actuated to translate upwardly or downwardly. An operating height of the window 104, as disclosed herein, refers to a position of a top edge 122 of the window 104 relative to a reference surface. For example, an operating height H1 of the window 104 can be measured as a distance between the top edge 122 of the window 104 and a lower edge 124 of a window frame 126 of a door of the vehicle 102. An operating height H1 of the window 104 can alternatively be measured as a distance between the top edge 122 of the window 104 and an upper edge 120 of the window frame 126 of a door of the vehicle 102. In yet another example, the operating height of a window could be determined by measuring a change in position of a fiduciary object in the window. For example, the window could embed an element, such as a symbol, that is detectable by a camera, or analysis of camera images.

The operating height H1 could alternatively be measured as a distance between a location of the top edge 122 of the window 104 when the window 104 is full extended (e.g., completely rolled up) to a location of the top edge 122 of the window 104 when the window 104 has been rolled down at least some distance. This could be measured by a count of rotations of a motor or actuator for the window, or at least an actuation period of the motor or actuator. For example, if the motor or actuator for the window is operated for two seconds, a corresponding change in operating height could be determined.

Figure 2:
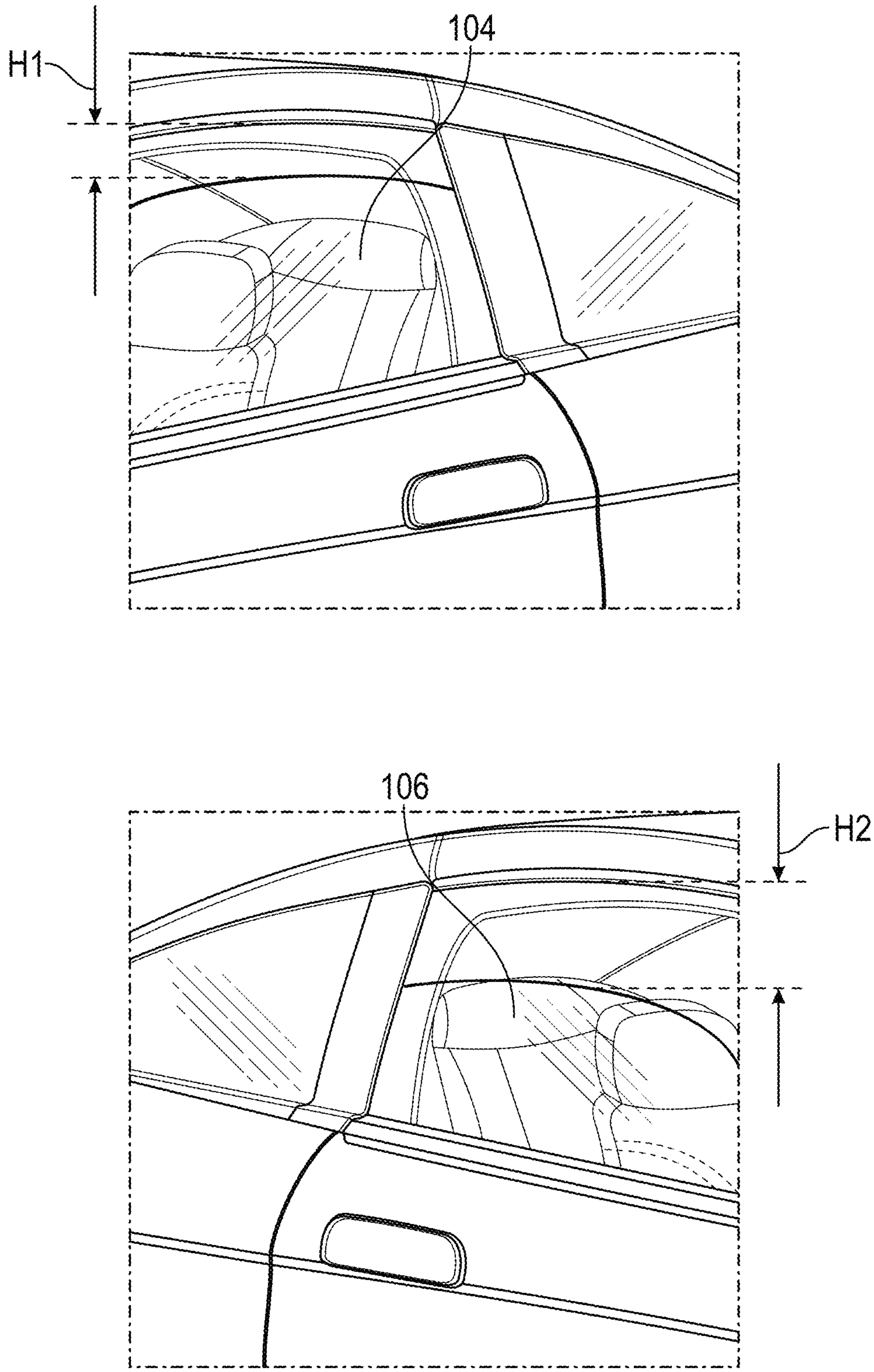
FIG. 2 diagrammatically illustrates an automatic window alignment process of the present disclosure.
Figure 2:
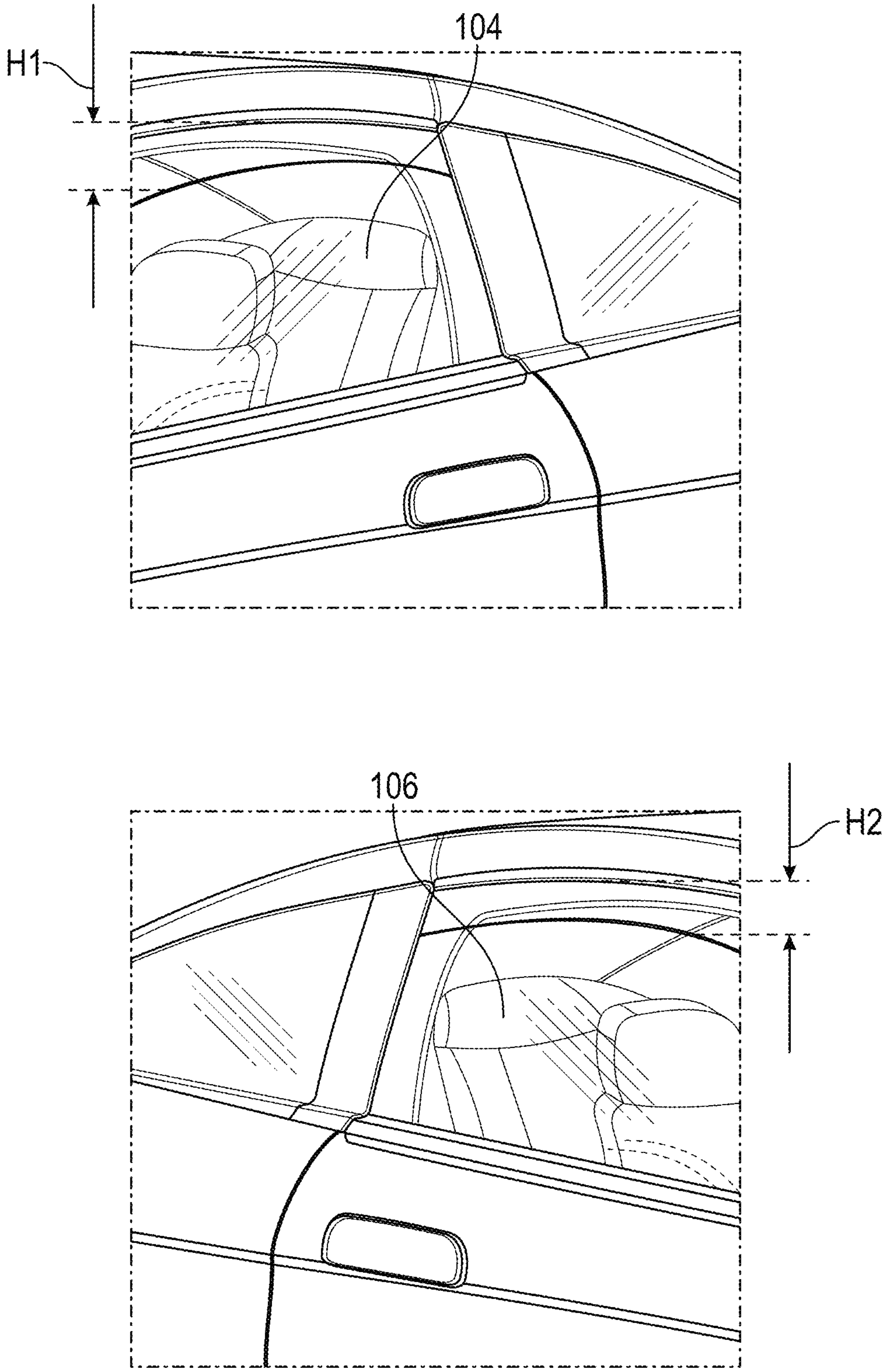

Regardless of the method(s) used, the operating height H2 of the window 106 can be determined in a similar manner as that used for the window 104. Both operating heights are illustrated in FIG. 2. Methods for comparing the operating heights and selectively adjusting window positions in response will be discussed in greater detail with respect to the window control module 112.

The window control module 112 can be implemented in any desired vehicle system, such as an infotainment system 128 of the vehicle. The window control module 112 can be implemented in the form of control logic that is installed in the infotainment system 128. The window control module 112 can be executed by a process and memory of at least one vehicle system, such as the infotainment system 128.

Alternatively, the window control module 112 can include a dedicated hardware device installed on the vehicle 102 that is operatively coupled to the windows of the vehicle, either directly or indirectly. The window control module 112 can comprise a processor 130 and memory 132. The memory 132 stores instructions that are executed by the processor 130 to perform aspects of window height adjustment and alignment as disclosed throughout. When referring to operations executed by the window control module 112, it will be understood that this includes the execution of instructions by the processor 130.

As noted above, operating heights and adjustments thereto can be made using camera images. The first camera 114 can be arranged to obtain images of the window 106 and the second camera 116 can be arranged to obtain images of the window 104. The cameras could be integrated into support pillars of the vehicle, or alternatively into a rearview mirror of the vehicle, with one camera pointed at the window 104 and another camera pointed at the window 106.

The window control module 112 can be configured to detect when the window 104 has been rolled down. For example, the window control module 112 can be operatively connected to a switch or actuator that controls the window 104. The window control module 112 can also periodically evaluate a position of the window 104 to determine if it has moved. As noted above, the window control module 112 can determine if the top edge 122 of the window 104 has moved relative to one image taken at a first point in time to a second image taken at a second point in time.

Thus, the window control module 112 can determine if the operating height H1 of the window 104 has changed over time. In more detail, the window control module 112 can determine a change in operating height H1 of the window 104 based on images from the second camera 116. The window control module 112 can determine a change in operating height H2 of the window 106 based on images from the first camera 114. To be sure, the specific camera used to obtain images of the windows can vary according to the placement of the cameras within the vehicle. In some instances, the window control module 112 does not rely upon detecting movement of a window to trigger a window height alignment process, but the window control module 112 can periodically evaluate camera images of the window 104 and the window 106 and perform period alignment of window operating heights when discrepancies are determined.

When the window control module 112 determines that a change in the operating height H1 of the window 104 has occurred, the window control module 112 can cause a corresponding change in operating height H2 of the window 106. This could include causing the window 106 to be moved upwardly or downwardly based on the current position of the window 106. In one example, the window 104 includes a driver's side window and the window 106 is the passenger's side window. It will be understood that it may not be practicable or feasible to set the operating height H1 and the operating height H2 to be perfectly equal. Thus, substantial equality in operating heights may be sufficient where the operating heights are aligned closely enough that the windows appear to be symmetric.

In FIG. 2, the operating height H2 of the window 106 is determined to be higher than the operating height H1 of the window 104. The window control module 112 selectively adjusts the operating height H2 of the window 106, causing the window 106 to travel downwardly. This downward movement of the window 106 causes substantial alignment in the operating height H1 and the operating height H2.

Alternatively, the window control module 112 can align the operating heights of the windows 104 and 106 by initially rolling both of the windows 104 and 106 up completely or down completely. Based on a selection of one of a plurality of window personalization settings (described in greater detail infra), the windows 104 and 106 can be actuated upwardly or downwardly to ¼, ½, or ¾ of the full, rolled up distance of the windows. For example, if the windows are completely rolled up, the window control module 112 can translate the windows 104 and 106 down to ¼, ½, or ¾ relative to their completely rolled up positions. The same process can be used vice-versa when the windows are completely rolled down. Variations in current window height can be overcome by either completely rolling the windows up or down initially, prior to attempting to align their operating heights.

The window control module 112 can be toggled on or off as desired. When the window control module 112 has been toggled off, independent movement of the windows 104 and 106 is enabled. When the window control module 112 has been toggled on, automatic controlled movement of the window 106 is enabled based on movement of the window 104 (or vice-versa).

The window control module 112 can be toggled on or off through an option provided through the infotainment system 128. In general, the infotainment system 128 is a human machine interface that can be incorporated into a central console of the vehicle. The window control module 112 can be toggled on or off using a control mechanism, such as a physical or virtual button provided on the infotainment system 128, as described in greater detail herein with respect to FIG. 3.

In addition to toggling on or off of the window control module 112, the window control module 112 can present additional features, such as specific window control modes. These additional modes can be used to select differing window movement ratios for a first row of windows relative to a second row of windows. For example, windows 104 and 106 are a first row and windows 108 and 110 are a second row. A window control mode can define that the first row and second row are to have identical operating heights. Thus, the windows 104-110 are each set to have the same operating height. Another window control mode can set the first row and second row to have a ratio of operating heights of 1:2. Thus, the windows of the second row are set to be rolled down to twice the operating height selected for the first row. Another window control mode can set the first row and second row to have a ratio of operating heights of 1:3. Thus, the windows of the second row are set to be rolled down to three times the operating height selected for the first row.

The window control module 112 can establish a predetermined translation limit for the second row of windows. Thus, regardless of the window control mode selected, travel of the second row of windows can be limited to prevent the windows from traveling more than a set distance. This feature can protect riders such as children and/or pets. These predetermined translation limits can be applied to the front row of windows as well. The predetermined translation limits can also be applied to windows in the same row. For example, the translation of window 106 can be limited to a percentage of the travel of the window 104.

Figure 3:
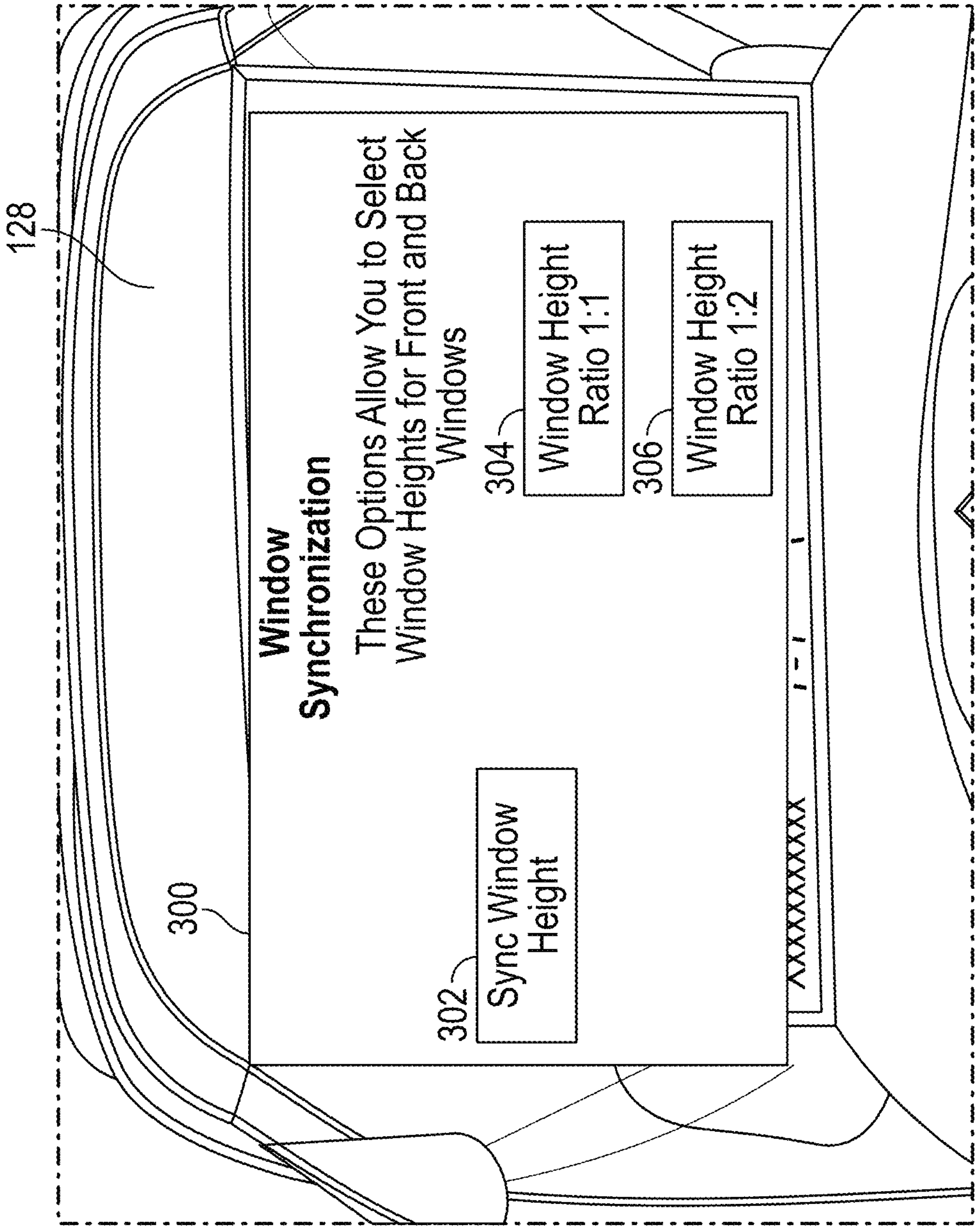
FIG. 3 is a screenshot of a graphical user interface displayed on a human machine interface, such as an infotainment system.

FIG. 3 illustrates a menu 300 presented on the infotainment system 128 of FIG. 1. The menu 300 includes a window synchronization button 302 that can toggle on or of the window level synchronization (also referred to as a window personalization setting) methods disclosed above. The menu 300 could also include various multi-row options.

When option 304 is selected, the second row of windows will be lowered to the same operating height as the first row of windows. When option 306 is selected, the second row of windows will be lowered to an operating height that is twice as low as the operating height of the first row of windows. These various ratios are referred to generally as preselected roll down values. The user can be allowed to select a preselected roll down value of a plurality of preselected roll down values.

Referring briefly back to FIG. 1, the vehicle 102 can comprise a voice control system 136 that allows a driver to utilize natural language commands to activate or deactivate a window personalization setting. The voice control system 136 can be configured to present the driver with a plurality of window personalization settings and allow the driver to speak their selection from the list.

In another use case, window control can be based on use of the actuator 118. The actuator 118 can include a physical button, lever, switch, or other similar mechanism preset within the vehicle. The actuator 118 can be operatively coupled to the window 104 and the window 106. When the actuator 118 is located in close proximity to the window 104, a spatial distance between the actuator 118 and the window 106 exists. When a voltage is applied, the distance between the actuator 118 and the window 106 results in a voltage drop. That is, the window 106 may receive less power per second than the window 104 when the actuator 118 is utilized. In these instances, the window control module 112 can calculate an approximation of voltage lost on the window 106 relative to the window 104. The window control module 112 can determine extra time required to apply a same amount of power to both windows based on the period of time during which the user is pressing the actuator 118, as well as other mitigating/attenuating factors such as temperature that could affect voltage drop. For example, based on the voltage drop, the window control module 112 may continue to apply the voltage to the second window for three-tenths of a second longer than for the window 104.

The methods described above related to the use of camera images can be used to verify alignment of the operating heights of the windows. For example, if the time adjusted voltage application based on the voltage drop was inaccurate, the window control module 112 can utilize the camera image-based alignment process described above to fine tune the window height alignment.

Figure 4:
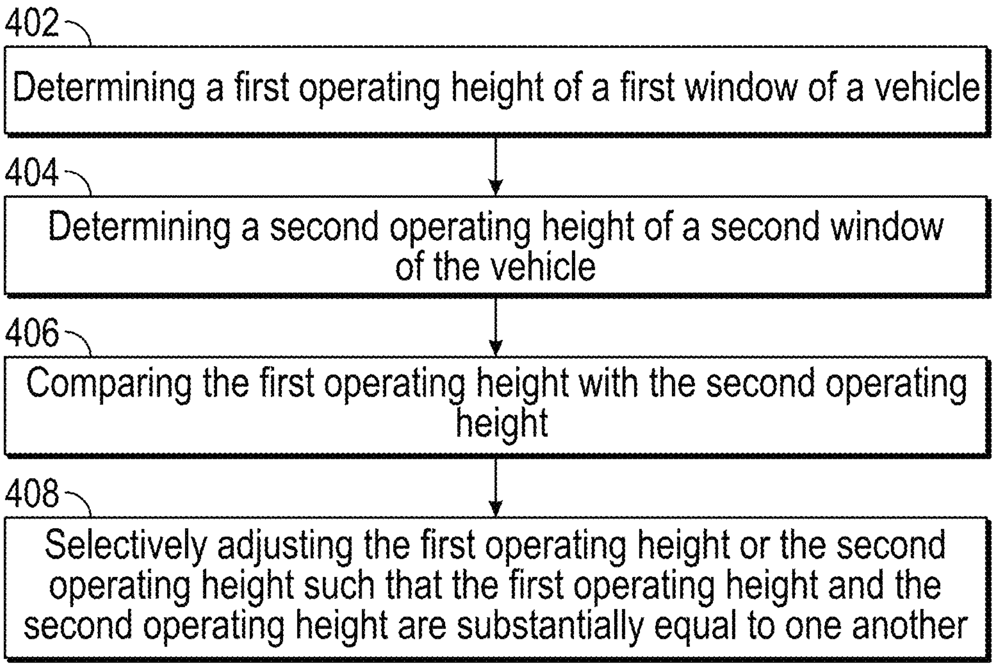
FIG. 4 is a flowchart of an example method of the present disclosure.

FIG. 4 is a flowchart of an example method of the present disclosure. The method can include a step 402 of determining a first operating height of a first window of a vehicle. The method can also include a step 404 of determining a second operating height of a second window of the vehicle. These respective operating height determinations can be made using any of the methods disclosed above, such as using camera images to determine top edge window positions. Next, the method includes a step 406 of comparing the first operating height with the second operating height. The method can also include a step 408 of selectively adjusting the first operating height or the second operating height such that the first operating height and the second operating height are substantially equal to one another. That is, when the first operating height and the second operating height are not substantially equivalent, the second operating height of the second window could be adjusted to substantially align with the first operating height of the first window.

Figure 5:
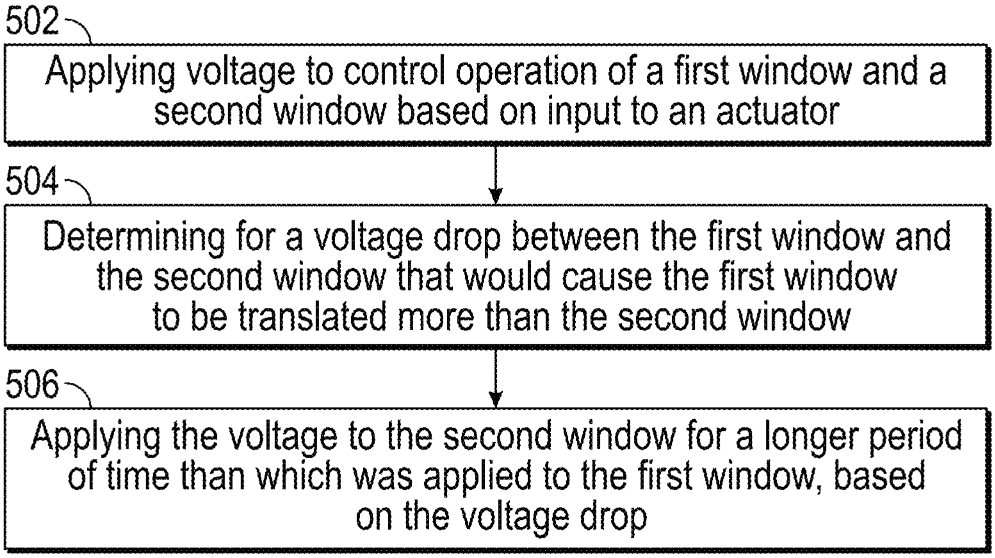
FIG. 5 is a flowchart of another example method of the present disclosure.

FIG. 5 is a flowchart of an example method of the present disclosure. The method can be performed within the context of a system that includes an actuator that is operatively coupled with a first window and a second window. The method may include a step 502 of applying voltage to control operation of a first window and a second window based on input to an actuator. The method can include a step 504 of determining for a voltage drop between the first window and the second window that would cause the first window to be translated more than the second window. Next, the method can include a step 506 of applying the voltage to the second window for a longer period of time than which was applied to the first window, based on the voltage drop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices.

When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method for adjusting a plurality of windows of a vehicle, comprising:

determining a first operating height of a first window of the plurality of windows;

determining a second operating height of a second window of the plurality of windows;

comparing the first operating height with the second operating height; and selectively adjusting the first operating height or the second operating height such that the first operating height and the second operating height are substantially equal to one another, wherein the selective adjustment of the first operating height and the second operating height is performed by application of a voltage to the first window and the second window.

2. The method according to claim 1, wherein the first window and the second window are both front windows of the vehicle of a first row.

3. The method according to claim 1, wherein the first operating height indicates that the first window is partially rolled down.

4. The method according to claim 1, wherein selectively adjusting the first operating height or the second operating height includes:

determining actuation of the first window of the vehicle; and actuating the second window in response to the actuation of the first window.

5. The method according to claim 1, further comprising presenting a control mechanism on a human machine interface that allows a user to activate a window personalization setting, wherein the window personalization setting allows the user to select a fraction relative to a rolled up position of the first window and the second window.

6. The method according to claim 1, wherein the first operating height or the second operating height are determined from camera images.

7. A system, comprising:

a processor; and a memory for storing instruction, the processor executing the instructions to:

determine that a first window is partially rolled down; and cause a second window to be partially rolled down such that a second operating height of the second window is substantially equal to a first operating height of the first window, wherein the partial rolling down of the second window is performed by application of a voltage to the first window and the second window.

8. The system according to claim 7, further comprising an actuator electrically coupled to both the first window and the second window, wherein the actuator can cause translation of the first window and the second window by application of the voltage to the first window and the second window.

9. The system according to claim 8, wherein the processor is configured to compensate for a voltage drop of the voltage between the first window and the second window that would cause the first window to be translated more than the second window.

10. The system according to claim 9, wherein the processor compensates for the voltage drop by:

calculating the voltage drop; and applying the voltage to the second window for a first period of time based on the voltage drop, wherein the first period of time is longer than a second period of time, and wherein the voltage was applied to the first window for the second period of time.

11. The system according to claim 7, wherein the processor is configured to apply a predetermined translation limit that limits how far the first window or the second window is rolled down.

12. The system according to claim 7, wherein the processor is configured to provide a control mechanism on a human machine interface, the control mechanism including a preselected roll down value of a plurality of preselected roll down values, wherein each of the plurality of preselected roll down values is configured to apply to a row of windows in the vehicle, and wherein the first window is partially rolled down based on selection of the preselected roll down value.

13. The system according to claim 7, further comprising a first camera that is configured to measure a first operating height of the first window based on the first window being partially rolled down.

14. The system according to claim 13, further comprising a second camera that is configured to measure a second operating height of the second window.

15. The system according to claim 7, further comprising selectively translating a third window until a third operating height of the third window and a fourth operating height of a fourth window are substantially equal to one another.

16. The system according to claim 15, wherein the third operating height and the fourth operating height are different than the first operating height and the second operating height.

17. The system according to claim 16, wherein the first operating height is greater than or equal to a predetermined translation limit.

18. The system according to claim 17, further comprising applying a preselected roll down value of a plurality of preselected roll down values, wherein each of the plurality of preselected roll down values is configured to apply to a row of windows in the vehicle, and wherein the first window is partially rolled down to the first operating height based on selection of the preselected roll down value.

19. A method for adjusting a plurality of windows of a vehicle, comprising:

applying voltage to a first window of the plurality of windows and a second window of the plurality of windows to control operation of the first window and the second window based on input to an actuator;

compensating for a voltage drop between the first window and the second window that would cause the first window to be translated more than the second window;

determining the voltage drop; and applying a voltage to the second window for a first period of time based on the voltage drop, wherein the first period of time is longer than a second period of time, and wherein the voltage was applied to the first window for the second period of time.

20. The method according to claim 19, further comprising:

comparing a first operating height of the first window with a second operating height of the second window; and selectively adjusting the first operating height or the second operating height to be substantially equal to one another when the first operating height and the second operating height are not substantially equal.

* * * * *